United States Patent [19]

Levin

[11] Patent Number: 4,457,815
[45] Date of Patent: Jul. 3, 1984

[54] ELECTROLYTIC CELL, PERMIONIC MEMBRANE, AND METHOD OF ELECTROLYSIS

[75] Inventor: Mark Levin, Pittsburgh, Pa.
[73] Assignee: PPG Industries, Inc., Pittsburgh, Pa.
[21] Appl. No.: 328,883
[22] Filed: Dec. 9, 1981
[51] Int. Cl.³ .................. C25B 11/04; C25B 9/04
[52] U.S. Cl. ............................... 204/98; 204/128; 204/252; 204/282; 204/296
[58] Field of Search ............ 204/98, 128, 282, 296, 204/252, 283

[56] References Cited

U.S. PATENT DOCUMENTS

| 4,191,618 | 4/1980 | Coker et al. | 204/91 |
| 4,210,501 | 7/1980 | Dempsey et al. | 204/129 |
| 4,224,121 | 9/1980 | Dempsey | 204/98 |
| 4,293,394 | 10/1981 | Darlington | 204/98 |
| 4,299,674 | 11/1981 | Korach | 204/98 |
| 4,299,675 | 11/1981 | Korach | 204/98 |
| 4,323,435 | 4/1982 | Carlin | 204/98 |

FOREIGN PATENT DOCUMENTS 29751  6/1981  European Pat. Off. .

*Primary Examiner*—John F. Niebling
*Attorney, Agent, or Firm*—George D. Morris; Richard M. Goldman

[57] ABSTRACT

Disclosed is a permionic membrane having a porous film of surface and electrocatalyst on at least one surface thereof. Also disclosed is an electrolytic cell with the permionic membrane, an electrolytic process utilizing the permionic membrane, and an electrolytic process utilizing the electrolytic cell.

63 Claims, 1 Drawing Figure

U.S. Patent    Jul. 3, 1984    4,457,815
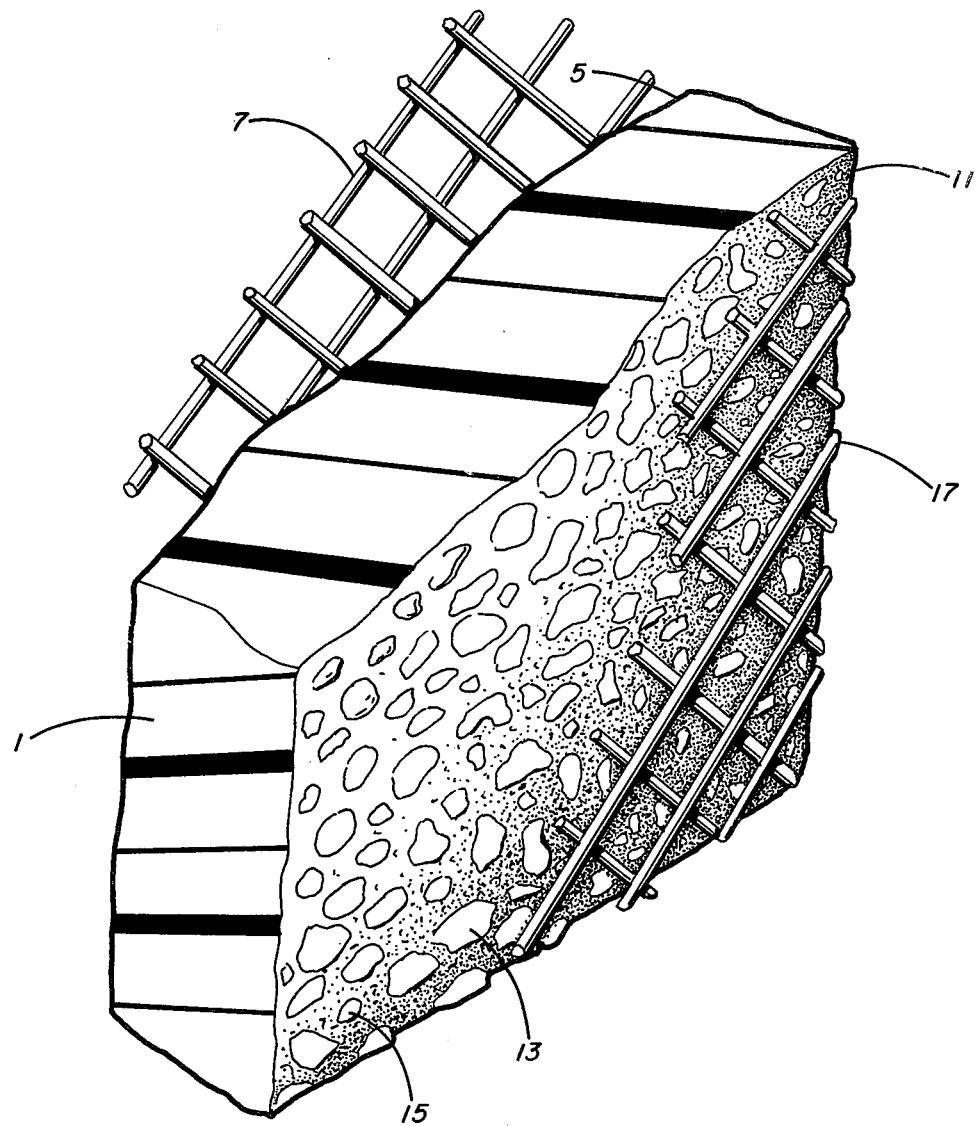

ELECTROLYTIC CELL, PERMIONIC MEMBRANE, AND METHOD OF ELECTROLYSIS

This invention relates to electrolytic cells having an anolyte compartment with an anode therein, a catholyte compartment with a cathode therein, and a permionic membrane therebetween, intended for the electrolysis of aqueous, ionic, media, such as aqueous sodium chloride to permionic membranes therefor, and to electrolytic processes using the aforementioned electrolytic cell and permionic membrane.

In one exemplification herein contemplated, the anode of the electrolytic cell is separated from the cathode of the electrolytic cell by a cation selective permionic membrane. In the process of electrolysis using the cell an electrical potential is established between the anode and the cathode and an electrical current is passed from the anode to the cathode, whereby to evolve products at the anode and cathode, e.g., chlorine at the anode, and hydrogen at the cathode. The permionic membrane substantially prevents the passage of anions from the anolyte compartment to the catholyte compartment and, where the cathode is spaced from the permionic membrane, the passage of anions, e.g., hydroxyl ion, from the catholyte compartment to the anolyte compartment.

It has previously been found advantageous to position the anode and cathode in close proximity to the permionic membrane, i.e., as in a solid polymer electrolyte electrolytic cell where the cathode and the anode are bonded to or directly embedded in the permionic membrane, or in a so-called zero gap electrolytic cell where the anode or the cathode, or both are removably held in contact with the permionic membrane.

A problem encountered in those electrolytic cells, for the electrolysis of alkali metal chlorides which have the cathode in contact with the permionic membrane, e.g., bonded to the permionic membrane such as in a solid polymer electrolyte cell, or removably in contact with the permionic membrane as in a zero gap electrolytic cell, is the diffusion of hydroxyl ion through the permionic membrane. One described method for remedying the diffusion of hydroxyl ion through the permionic membrane is the use of a porous, non-electrode film on at least one surface of the permionic membrane, such as the film described in European Patent Application Publication No. 0,029,751 of Asahi Glass Company, Ltd. As there described, a porous film, for example of a particulate, non-catalytic, non-conductive material, is provided on the surface of the permionic membrane and the electrode is disposed in proximity thereto.

An alternative method of reducing the diffusion of hydroxyl ion through the permionic membrane from the catholyte liquor to the anolyte liquor is reported in U.S. Pat. No. 4,272,353, of Lawrance et al for METHOD OF MAKING SOLID POLYMER ELECTROLYTE AND CATALYTIC ELECTRODES AND ELECTRODES MADE THEREBY wherein the surface of the permionic membrane is treated by causing an abrading or roughening means, e.g., a silicon carbide sheet, to contact the surface of the permionic membrane in at least two directions. Thereafter the electrocatalyst is bonded directly on the abraded sheet.

In accordance with this invention a particularly desirable permionic membrane may be prepared by disposing a porous film of both surface catalyst and electrocatalyst on the surface of the permionic membrane. Separate electrocatalyst of an electrode may be maintained in contact with the porous film of surface catalyst and electrocatalyst, for example, by being bonded thereto as in a solid polymer electrolyte configuration, or removably bearing thereon as in a zero gap electrolytic cell configuration or, even spaced therefrom but in proximity thereto.

THE FIGURE

The FIGURE is an isometric view of a portion of an anode-permionic membrane-cathode assembly of one exemplification of this invention.

DETAILED DESCRIPTION OF THE INVENTION

A permionic membrane provided with at least one surface comprising a porous film having well dispersed therein surface catalyst and electrocatalyst is used in an electrolytic cell, e.g., for the electrolysis of alkali metal chlorides, to reduce the diffusion of anions, e.g., hydroxyl ions, from the catholyte compartment to the anolyte compartment. In this way need for hydroxide corrosion resistant anode materials is, to some extent, reduced and the necessity for spacing the electrodes from the permionic membrane is eliminated.

The permionic membrane of the invention has a porous film of an electrocatalyst and a surface catalyst in admixture on an outer surface thereof.

An exemplification of this invention in a zero gap configuration is shown in the FIGURE. The permionic membrane 1 has an anolyte facing surface 5 with an anode 7 bearing thereon. The opposite, cathodic surface 11 of the permionic membrane has surface catalyst particles 13 and electrocatalyst particles 15 thereon. Bearing on the particles 13, 15 is a foraminous, metal mesh cathode 17.

The surface catalyst particles 13 and the electrocatalyst particles 15 are shown as being of different size for illustration purposes only, to illustrate the randomness of mixture and the location thereof with respect to the permionic membrane 1 and the cathode 17.

The terms "electrocatalyst" and "surface catalyst" as used herein are relative terms, the "electrocatalyst" being catalytic for the intended electron transfer reaction and having a significantly lower overvoltage for the intended reaction than the "surface catalyst", i.e., the "electrocatalyst" has an overvoltage for the intended reaction at least 100 millivolts less than the overvoltage for the intended reaction of "surface catalyst". Both the "surface catalyst" and the "electrocatalyst" are preferably hydrophillic. In one embodiment the "surface catalyst" has a lower electrical conductivity than the "electrocatalyst," the "surface catalyst" preferably being of a non-conductive material.

As used herein, the overvoltage is the additional voltage above that of the half cell voltage which must be impressed to cause the reaction to proceed. The difference between the electrode potential necessary for the flow of current and the equilibrium value of the electrode with no current flowing is the experimentally determined electrode overvoltage. The overvoltage varies with the nature of the electrode, the electrocatalyst used in the electrode, the surface condition thereof, and the concentration of various components in the electrolyte.

A suitable method of determining chlorine overvoltage is as follows:

A two-compartment cell constructed of polytetrafluoroethylene with a diaphragm composed of asbestos paper is used in the measurement of chlorine overpotentials. A stream of water-saturated Cl$_2$ gas is dispersed into a vessel containing saturated NaCl, and the resulting Cl$_2$-saturated brine is continuously pumped into the anode chamber of the cell. In normal operation, the temperature of the electrolyte ranges from 30° to 35° C., most commonly 32° C., at a pH of 4.0. A platinized titanium cathode is used.

In operation, an anode is mounted to a titanium holder by means of titanium bar clamps. Two electrical leads are attached to the anode; one of these carries the applied current between anode and cathode at the voltage required to cause continuous generation of chlorine. The second is connected to one input of a high impedence voltmeter. A Luggin tip made of glass is brought up to the anode surface. This communicates via a salt bridge filled with anolyte with a saturated calomel half cell. Usually employed is a Beckman miniature fiber junction calomel such as Catalog No. 39270, but any equivalent one would be satisfactory. The lead from the calomel cell is attached to the second input of the voltmeter and the potential read.

Calculation of the overvoltage, $\eta$, is as follows:

The Internal Union of Pure and Applied Chemistry sign convention is used, and the Nernst equation taken in the following form:

$$E = E_o \frac{2.303\ RT}{nF} \log \frac{\text{[oxidized]}}{\text{[reduced]}}$$

Concentrations are used for the terms in brackets instead of the more correct activities.

$E_o$ = the standard state reversible potential = +1.35 volts
n = number of electrons equivalent$^{-1}$ = 1
R, gas constant, = 8.314 joule deg$^{-1}$ mole$^{-1}$
F, the Faraday = 96,500 couloumbs equivalent$^{-1}$
Cl$_2$ concentration = 1 atm
Cl$^-$ concentration = 5.4 equivalent liter$^{-1}$ (equivalent to 305 grams NaCl per liter)
T = 305°K.
For the reaction
Cl$^- \rightarrow \frac{1}{2}$ Cl$_2$+e$^-$,
E = 1.35 + 0.060 log 1/5.4 = 1.30
This is the reversible potential for the system at the operating conditions. The overvoltage on the normal hydrogen scale is, therefore, $$\eta = V - [E - 0.34]$$

where V is the measured voltage,
E is the reversible potential, 1.30, and 0.24 is the potential of the saturated calomel half cell.

Hydrogen overvoltage of the cathode is determined analogously.

By a surface catalyst is meant a generally non-conductive material that is not catalytic for the intended electron transfer reaction conducted in proximity thereto, and does not act as a catalyst for the intended electron transfer reaction. In one embodiment the surface catalyst materials have an electrical conductivity of less than 10 reciprical (ohm centimeters) and preferably less than one reciprical (ohm centimeter). Such materials are exemplified by surface active inorganic compounds having an electrical conductivity of from about 0.001 reciprical (ohm-centimeter) to about 0.0001 reciprical (ohm centimeters) or less.

While the surface catalyst is preferably of low electrical conductivity, it is to be understood that in the broadest sense herein contemplated the material can be of high conductivity as long as the overvoltage for the intended electrode reaction conducted in proximity thereto is higher than the overvoltage for the intended reaction of the electrocatalyst admixed therewith and in proximity thereto, e.g., about 100 or more millivolts higher.

The surface catalyst is most commonly a particulate material having a mass average particle size of from about 0.01 to about 300 microns and preferably from about 0.1 to about 100 microns. The individual ultimate particles most frequently are non-porous, providing a porous film of substantially non-porous ultimate particles. By the ultimate particles being non-porous is meant that the individual ultimate particles, as distinguished from agglomerates thereof, have a density of from about 85 to about 99 percent of the theoretical density of the surface catalyst material. Moreover, the surface catalyst may be present as a gel, emulsion, or suspension on the permionic membrane.

Exemplary surface catalyst materials include insoluble metals, metal oxides, metal hydroxides, metal carbides, metal nitrides, metal borides, metal sulfides, and mixtures thereof. Typically the metals or the surface catalytic compounds thereof are selected from group 5A of the Periodic Table as germanium, tin, and lead, from group 4B of the Periodic Table as titanium, zirconium, and hafnium, from group 5B of the Periodic Table as vanadium, columbium, and tantalum, from group 6B of the Periodic Table as iron, cobalt, and nickel, and aluminum, manganese, and antimony. These metals may be present as alloys, oxides, hydroxides, nitrides, carbides, borides, or combinations thereof. Most commonly the surface catalyst will be titanium, zirconium, columbium, titanium, vanadium, or tin, and will be present in the form of an oxide, hydroxide, hydrous oxide gel, nitride, carbide, boride, and combination thereof. Generally, the surface catalyst on the anode and cathode side will be oxides of the valve metals, i.e., oxides of tantalum, oxides of tungsten, oxides of titanium oxides of zirconium, oxides of columbium, and the like.

The electrocatalyst is generally a conductive material having an electrical conductivity of from about 100 reciprical (ohm centimeters) to about 500,000 reciprical (ohm centimeters), for example, as exemplified by carbon having a conductivity above about 100 reciprical (ohm centimeters) to Raney nickel, and platinum black having conductivities above about 100,000 to above about 150,000 reciprical (ohm centimeters), and copper having a conductivity above about 600,000 reciprical (ohm centimeters).

While the electrocatalyst may be defined in terms of its electrical conductivity, it is to be understood that certain semiconductors, e.g., doped semiconductors having crystal defects such as isostructural ruthenium dioxide-titanium dioxide, have conductivities less than 100 reciprical (ohm centimeters) but high degrees of electrocatalytic activity and may be used as the electrocatalyst. The electrocatalyst is characterized by having an overvoltage for the electrode reaction contemplated at least about 10 millivolts, and preferably about 25 or more millivolts below that of the surface catalyst.

The electrocatalyst is preferably a particulate material having a mass average particle size of from about 0.01 microns to about 300 microns and preferably from about 0.1 to about 100 microns, and the individual ultimate particles are substantially imporous. By the individual ultimate particles being imporous is meant that the individual ultimate particles, as distinguished from agglomerates thereof, are from about 85 to about 99 percent of theoretical density.

Exemplary electrocatalyst materials for the anodic side include the platinum group metals as well as oxides and oxycompounds thereof, for example, platinum black, and isostructural oxycompounds such as platinum group metal perovskites, platinum group metal spinels and platinum group metal crystal defect semiconductors. An exemplary crystal defect semiconductor is the isostructural ruthenium dioxide-titanium dioxide. By oxycompounds of the platinum group metals are meant compositions of the platinum group with oxygen and another metal, as in spinels, perovskites, delafossites, and semiconductive oxides.

Exemplary electrocatalysts for the cathodic reaction include the transition metals of group 8 of the Periodic Table, as exemplified by iron, cobalt, and nickel, especially when present in forms having enhanced surface area, i.e., enhanced surface activity. The high surface area forms include leached codeposits of the transition metal with zinc, leached deposited Raney alloys, and blacks, for example, platinum black, palladium black, and the like.

As herein contemplated, the surface catalyst is from about 5 to about 99 percent of the total surface catalyst and electrocatalyst, and generally from about 75 to about 95 percent of the total surface catalyst and electrocatalyst. The particles of surface catalyst and electrocatalyst are in substantially uniform admixture.

The porous film may be bonded to and embedded in a fluorocarbon, for example, in a thermoplastic fluorocarbon, or hot pressed to the thermoplastic fluorocarbon or to the permionic membrane, or sintered, for example with polytetrafluoroethylene. The fluorocarbon may itself have porosity, as provided by abrasion, a leachable pore forming material, or a volatile pore forming material.

The porosity of the porous film is from about 10 to about 99 percent. Most frequently the porosity is from about 25 to about 95 percent and in an especially preferred exemplification from about 40 to about 90 percent. As used herein, porosity is 100 minus 100 times the actual densitity divided by the theoretical density.

The thickness of the porous film is from about 0.01 to about 300 microns, especially from about 0.1 to about 200 microns, and in a particularly preferred exemplification from about 1 to about 100 microns. The loading of the porous film is from about 0.1 milligram per square centimeter to about 100 milligrams per square centimeters, especially from about 1 milligram per square centimeter to about 50 milligrams per square centimeter. It it is to be understood there may be different thicknesses and porosities, and weight loadings on the anode and cathode sides of the permionic membrane.

The porous film may be present only on the anodic surface of the permionic membrane, only the cathodic surface of the permionic membrane, or on both the anodic and cathodic surfaces of the permionic membrane. The electrodes may be in solid polymer electrolytic configuration with respect to the solid polymer configuration, that is, the electrocatalyst in the porous film may serve as the electrode where a high overvoltage conductor is the current lead, which high overvoltage conductor may be a porous sheet, screen or mesh bearing on the porous film. Alternatively, one or both of the electrodes may be in zero gap configuration with respect to the permionic membrane, that is, the electrode may be a porous sheet, plate, mesh or screen bearing on the permionic membrane, and of the same overvoltage or lower overvoltage than the electrocatalyst in the porous surface.

According to a still further exemplification, the electrodes may be in a conventional configuration having a porous sheet, plate, mesh, or film spaced from the permionic membrane, for example, by from about 0.25 millimeter to about 5 millimeters.

The fluorocarbon polymer of the cation selective permionic membrane is characterized by the presence of cation selective ion exchange groups, the ion exchange capacity of the membrane, the concentration of ion exchange groups in the membrane on the basis of water absorbed in the membrane, and the glass transition temperature of the membrane material.

The fluorocarbon resins herein contemplated have the moieties:

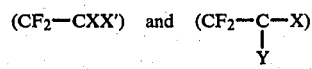

where X is —F, —Cl, —H, or —CF$_3$; X' is —F, —Cl, —H, —CF$_3$ or CF$_3$(CF$_2$)$_m$—; m is an integer of 1 to 5, and Y is —A, —$\phi$A, —P—A, or —O—(CF$_2$)$_n$ (P, Q, R)—A.

In the unit (P, Q, R,), P is —(CF$_2$)$_a$(CXX')$_b$(CF$_{2c}$, Q is (—CF$_2$—O—CXX')$_d$, R is (—CXX'—O—CF$_2$)$_e$, and (P, Q, R) contains one or more of P, Q, R, and is a discretionary grouping thereof.

$\phi$ is the phenylene group; n is 0 or 1; a, b, c, d, and e are integers from 0 to 6.

The typical groups of Y have the structure with the acid group, A, connected to a carbon atom which is connected to a fluorine atom. These include (CF$_2$)$_x$A, and side chains having ether linkages such as:

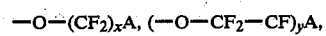

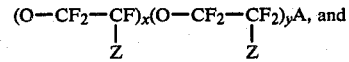

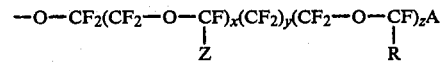

where x, y, and z are respectively 1 to 10; Z and R are respectively —F or a C$_{1-10}$ perfluoroalkyl group, and A is the acid group as defined below.

In the case of copolymers having the olefinic and olefin-acid moieties above described, it is preferable to have 1 to 40 mole percent, and preferably especially 3 to 20 mole percent of the olefin-acid moiety units in order to produce a membrane having an ion-exchange capacity within the desired range.

A is an acid group chosen from the group consisting of:

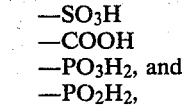

or a group which may be converted to one of the aforesaid groups by hydrolysis or by neutralization.

Whenever A is referred to as an acid group in characterizing the permionic membrane, it is to be understood that esters, alkali metals, hydrogen acids, acid halides, and other precursors and products are not excluded thereby. Whenever a membrane in an assembled electrolytic cell is referred to as being in the acid form, it is to be understood that the alkali salt form is also contemplated.

In one exemplification, A may be either $-SO_3H$ or a functional group which can be converted to $-SO_3H$ by hydrolysis or neutralization, or formed from $-SO_3H$ such as $-SO_3M'$, $(SO_2-NH) M''$, $-SO_2NH-R_1-NH_2$, or $-SO_2NR_4R_5NR_4R_6$; $M'$ is an alkali metal; $M''$ is HN, $NH_4$, an alkali metal, or an alkaline earth metal; $R_4$ is H, Na or K; $R_5$ is a $C_3$ to $C_6$ alkyl group, $(R_1)_2NR_6$, or $R_1NR_6 (R_2)_2 NR_6$; $R_6$ is H, Na, K or $-SO_2$; and $R_1$ is a $C_1-C_{10}$ alkyl group.

According to an alternative exemplification, the cation selectivity of the permionic membrane may vary between the anodic and cathodic regions thereof, the anodic region of the permionic membrane having a high cation selectivity and the cathodic region of the permionic membrane having a low cation selectivity. For example, in the anodic region of the membrane A may be a sulfonyl group, while in the cathodic region of the membrane, A may be a carboxyl group or a sulfonamide group.

In a particularly preferred exemplification of this invention, A may be either $-COOH$, or a functional group which can be converted to $-COOH$ by hydrolysis or neutralization such as $-CN$, $-COF$, $-COCl$, $-COOR_1$, $-COOM$, $-CONR_2R_3$; $R_1$ is a $C_{1-10}$ alkyl group and $R_2$ and $R_3$ are either hydrogen or $C_1$ to $C_{10}$ alkyl groups, including perfluoroalkyl groups, or both. M is hydrogen or an alkali metal; when M is an alkali metal it is most preferably sodium or potassium.

Cation selective permionic membranes where A is either $-COOH$, or a functional group derivable from or convertible to $-COOH$, e.g., $-CN$, $-COF$, $COCl$, $-COOR_1$, or $-COOM$, as described above, are especially preferred because of their voltage advantage over sulfonyl membranes. This voltage advantage is on the order of about 0.1 to 0.4 volt at a current density of 150 to 250 amperes per square foot, a brine content of 150 to 300 grams per liter of sodium chloride, and a caustic soda content of 15 to 40 weight percent sodium hydroxide. Additionally, the carboxylic acid type membranes have a current efficiency advantage over sulfonyl type membranes at high anolyte pH values, e.g., above about 4.0 and with anodes having an oxygen evolution overvoltage at least about 0.2 volt above the chlorine evolution overvoltage thereof.

The preferred membrane material herein contemplated has an ion exchange capacity from about 0.5 to about 2.0 milligram equivalents per gram of dry polymer, and preferably from about 0.9 to about 1.8 milligram equivalents per gram of dry polymer, and in a particularly preferred exemplification, from about 1.1 to about 1.7 milligram equivalents per gram of dry polymer. When the ion exchange capacity is less than about 0.5 milligram equivalents per gram of dry polymer, the voltage is high at the high concentrations of alkaline metal hydroxide herein contemplated, while when the ion exchange capacity is greater than about 2.0 milligram equivalents per gram of dry polymer, the current efficiency of the membrane is too low.

The content of ion exchange groups per gram of absorbed water is from about 8 milligram equivalents per gram of absorbed water to about 30 milligram equivalents per gram of absorbed water and preferably from about 10 milligram equivalents per gram of absorbed water to about 28 milligram equivalents per gram of absorbed water, and in a preferred exemplification from about 14 milligram equivalents per gram of absorbed water to about 26 milligram equivalents per gram of absorbed water. When the content of ion exchange groups per unit weight of absorbed water is less than about 8 milligram equivalents per gram or above 30 milligram equivalents per gram, the current efficiency is too low.

The glass transition temperature is preferably at least about 20° C. below the temperature of the electrolyte. When the electrolyte temperature is between about 95° C. and 110° C., the glass transition temperature of the fluorocarbon resin permionic membrane material is below about 90° C., and in a particularly preferred exemplification, below about 70° C. However, the glass transition temperature should be above about $-80°$ C. in order to provide satisfactory tensile strength of the membrane material. Preferably the glass transition temperature is from about $-80°$ C. to about 70° C. and in a particularly preferred exemplification, from about $-80°$ C. to about 50° C.

When the glass transition temperature of the membrane is within about 20° C. below the electrolyte, or is higher than the temperature of the electrolyte, the resistance of the membrane increases and the permselectivity of the membrane decreases. By glass transition temperature is meant the temperature below which the polymer segments are not energetic enough to either move past one another or with respect to one another by segmental Brownian motion. That is, below the glass transition temperature, the only reversible response of the polymer to stresses is strain, while above the glass transition temperature the response of the polymer to stress is segmental rearrangement to relieve the externally applied stress.

The fluorocarbon resin permionic membrane materials contemplated herein have a water permeability of less than about 100 milliliters per hour per square meter at 60° C. in four normal sodium chloride at a pH of 10 and preferably lower than 10 milliliters per hour per square meter at 60° C. in four normal sodium chloride of the pH of 10. Water permeabilities higher than about 100 milliliters per hour per square meter, measured as described above, may result in an impure alkali metal hydroxide product.

The electrical resistance of the dry membrane should be from about 0.5 to about 10 ohms per square centimeter and preferably from about 0.5 to about 7 ohms per square centimeter.

Preferably the fluorinated-resin permionic membrane has a molecular weight, i.e., a degree of polymerization, sufficient to give a volumetric flow rate of about 100 cubic millimeters per second at a temperature of from about 150° to about 300° C.

The thickness of the permionic membrane should be such as to provide a membrane that is strong enough to withstand pressure transients and manufacturing processes, but thin enough to avoid high electrical resistivity. Preferably the membrane is from 10 to 1000 microns thick, and in a preferred exemplification, from about 50 to about 400 microns thick. Additionally, internal reinforcement, or increased thickness, or cross-linking, or even lamination may be utilized whereby to provide a strong membrane.

In order to attain the high current densities herein contemplated, a uniform current distribution across the face of the permionic membrane is desirable. This may be accomplished by utilizing electrode substrates, i.e., for the exemplification where the anode or cathode or both of them bear upon the permionic membrane or the porous film, or current collectors, i.e., for the exemplification where the electrocatalyst within the porous is the anode or cathode, having a high percentage of open area, e.g., above about 40 to 60 percent open area, and a narrow pitch, e.g., about 0.5 to 2 millimeters between substrate elements. A suitable substrate or current collector is mesh or screen having 10 to 30 or more strands per inch, where the strands are from about 0.5 to about 2.5 millimeters apart, centerline to centerline, and a diameter such as to provide at least about 40, and preferably above about 60 percent open area and from about 75 to about 400 openings per square centimeter. The mesh or screen is fabricated of a material that is resistant to the electrolyte and electrically conductive, and has an electrocatalytic surface thereon. Alternatively, the electrode substrate or current collector may be a coated sheet or plate, having perforations on a pitch of 0.5 to 1.5 millimeters, and at least about 40 to 60 percent open area.

The anode substrate, where the anode is neither bonded to nor embedded in the permionic membrane or the porous film thereon, or the anodic current collector, where the anodic electrocatalyst is physically or chemically bonded to either the permionic membrane or the porous film thereon, is a porous screen, mesh, sheet, or plate, as described hereinabove, fabricated of a valve metal. By valve metals are meant those metals that form an oxide when subjected to air or to aqueous acidic media. The valve metals include the Group IVB metals, titanium, zirconium, and hafnium, the Group VB metals vanadium, columbium, and tantalum, tungsten, and aluminum. Most commonly titanium, zirconium, tantalum or tungsten will be used to provide the anode substrate or anodic current collector.

The cathode substrate, where the cathode is neither bonded to nor embedded in the permionic membrane or the porous film thereon, or the cathodic current collector, where the cathodic electrocatalyst is physically or chemically bonded to either the permionic membrane or the porous film thereon, is a porous screen, mesh, sheet or plate, as described hereinabove, fabricated of a metal that is substantially resistant to concentrated solutions of aqueous sodium hydroxide or potassium hydroxide. By substantially resistant to corrosion is meant a corrosion rate of under 0.02 inch year in concentrated alkali metal hydroxide when measured at 200° C. Exemplary materials include copper, iron, steel, stainless steel, high nickel steels, nickel, and high chromium steels, among others. Most commonly steel, stainless steel, or nickel will be used to provide the cathode substrate or cathode current collector.

According to one exemplification of this invention, there is provided an electrolytic cell having a cation selective permionic membrane of a copolymer of perfluorinated hydrocarbon and of a perfluorinated hydrocarbon having pendant groups of carboxylate functionality such as the permionic membrane marketed by Asahi Glass Company under the trademark FLEMION. On one surface thereof is a thin porous film with a porosity of about 40 percent to about 70 percent, and a thickness of about 50 to about 100 microns, and made up of titanium dioxide particles having a mass average particle size of 0.1 micron to about 100 microns in admixture with particles having a mass average particle size of about 0.1 micron to about 100 microns of an intermetallic composition of titanium dioxide and ruthenium dioxide, embedded in and bonded to the permionic membrane. In contact therewith is an anode having a coating of titanium dioxide and ruthenium dioxide on titanium mesh screen.

On the opposite side of the permionic membrane is a film of zirconium dioxide particles and Raney nickel particles, the zirconium dioxide particles having a mass average size of from about 0.1 micron to about 100 microns and being about 75 weight percent to about 95 weight percent of the film and the Raney nickel particles having a mass average size of about 0.1 micron to about 100 microns and the balance of the film. The film on the cathodic surface has a thickness of from about 50 microns to about 200 microns and a porosity of from about 40 percent to about 70 percent. The cathode is a 12 mesh to the inch by 12 mesh to the inch nickel screen having Raney nickel on the surface thereof.

Sodium chloride brine containing about 275 grams per liter of sodium chloride is fed to the anolyte compartment, and electrical potential is established between the anode and cathode, chlorine is recovered from the anolyte compartment, and sodium hydroxide and hydrogen are recovered from the catholyte compartment.

According to an alternative exemplification of this invention, there is provided a solid polymer electrolyte wherein the permionic membrane is a copolymer of a perfluorinated hydrocarbon and a perfluorinated hydrocarbon having carboxylic functionality. The permionic membrane has a porous surface on the anodic surface about 100 microns to about 200 microns thick, with a porosity of about 40 percent to about 70 percent, formed of about 75 weight percent titanium dioxide particles having a mass average particle size of 1 to 100 microns and the balance particles of titanium dioxide and ruthenium dioxide having a mass average particle size of about 1 to 100 microns. The membrane has a porous film on the cathodic surface of from about 100 microns to about 200 microns thick, with a porosity of from about 40 percent to about 70 percent. It is formed of from about 30 weight percent to about 80 weight percent zirconium dioxide particles, balance platinum black particles.

In contact with the porous film on the anodic surface is a titanium mesh screen having about 16 to about 20 mesh to the inch, and a coating of titanium dioxide and ruthenium dioxide, the coated titanium mesh having a higher chlorine evolution overvoltage than the titanium dioxide-ruthenium dioxide particles within the porous film.

In contact with the porous film on the cathodic surface of the permionic membrane is a 16 mesh to the inch by 16 mesh to the inch nickel screen.

Sodium chloride brine is fed to the anolyte compartment of the solid polymer electrolyte electrolytic cell, and an electrical potential is established between the anode and cathode. Chlorine is recovered from the anolyte compartment, and sodium hydroxide and hydrogen are recovered from the catholyte compartment.

While the invention has been described with respect to certain particular electrolytes, it is to be understood that the anolyte feed may be various brines, for example sodium chloride, potassium chloride, or the like, as well as acids such as hydrochloric acid or sulfuric acid, or other alkali metal salts, for example sodium sulphate, sodium bisulphate, sodium carbonate, potassium sulphate, potassium bisulphate, potassium carbonate or the like. It is also to be understood that various electroorganic reactions may be carried out herein.

While the invention has been described with respect to hydrogen being evolved at the cathode, it is to be understood that hydrogen depolarizing means may be present at the porous film or in admixture therewith whereby, when combined with oxidant feed to the catholyte, the evolution of hydrogen may be substantially avoided, and the concomitant hydrogen overvoltage associated therewith similarly avoided.

While various permionic membrane materials have been described, it is to be understood that the permionic membrane may have different chemistries on the anodic and cathodic surface, for example a strongly cation selective material on the anodic side and a weakly cation selective material on the cathodic side, or even a cationic selective material on the anodic side and an anion selective barrier on the cathodic side.

While the method and apparatus of this invention have been described with reference to specific exemplifications, embodiments, and examples thereof, the scope of the invention is not to be limited thereby but only by the claims appended hereto.

I claim:

1. In an electrolytic cell having an anolyte compartment with an anode therein, a catholyte compartment with a cathode therein, and a permionic membrane therebetween, the permionic membrane having a porous film thereon, the improvement wherein the porous film comprises a random mixture of electrocatalyst particles and separate non-conductive surface catalyst particles, said electrocatalyst particles having an electrical conductivity of more than 10 ohm-centimeters$^{-1}$, and said particles being hydrophillic.

2. The electrolytic cell of claim 1 wherein the porous film is bonded to the permionic membrane with a fluorocarbon polymer.

3. The electrolytic cell of claim 1 wherein the porous film has a porosity of from about 10 to about 99 percent.

4. The electrolytic cell of claim 1 wherein the porous film has a thickness of about 0.01 to about 300 microns.

5. The electrolytic cell of claim 1 wherein the porous film contains from about 0.1 milligram per square centimeter to about 100 milligrams per square centimeter of total surface catalyst and electrocatalyst.

6. The electrolytic cell of claim 1 wherein the porous film contains from about 1 to about 95 weight percent electrocatalyst, basis total surface catalyst and electrocatalyst.

7. The electrolytic cell of claim 1 wherein the porous film is on the cathodic surface of the permionic membrane.

8. The electrolytic cell of claim 7 wherein the surface catalyst is chosen from the group consisting of oxides of titanium, tantalum, tungsten, zirconium, columbium, and mixtures thereof.

9. The electrolytic cell of claim 7 wherein the electrocatalyst is chosen from the group consisting of Group VIII transition metals and mixtures thereof.

10. The electrolytic cell of claim 7 wherein the cathode is the electrocatalyst in the porous surface.

11. The electrolytic cell of claim 7 wherein the cathode is in contact with the porous surface.

12. The electrolytic cell of claim 7 wherein the cathode is spaced from the porous surface.

13. The electrolytic cell of claim 1 wherein the porous surface is on the anodic surface of the permionic membrane.

14. The electrolytic cell of claim 13 wherein the surface catalyst is chosen from the group consisting of oxides of titanium, tantalum, tungsten, zirconium, columbium, and mixtures thereof.

15. The electrolytic cell of claim 13 wherein the electrocatalyst is chosen from the group consisting of platinum group metals, oxides thereof, and oxycompounds thereof.

16. The electrolytic cell of claim 13 wherein the anode is the electrocatalyst in the porous surface.

17. The electrolytic cell of claim 13 wherein the anode is in contact with the porous surface.

18. The electrolytic cell of claim 13 wherein the anode is spaced from the porous surface.

19. The electrolytic cell of claim 1 wherein the permionic membrane is a fluorocarbon polymer having the moieties:

$(CF_2-CXX')$ and $(CF_2-CXY)$ where:
X is chosen from the group consisting of —F, —Cl, —H, and —$CF_3$;
X' is chosen from the group consisting of —F, —Cl, —H, —$CF_3$, and $(CF_2)_mCF$,
where m is an integer from 1 to 5;
Y is chosen from the group consisting of —A, —$\phi$A, —P—A, and
—O—$(CF_2)_n$—(P,Q,R)—A,
where P is $(-CF_2)$
$(CXX')_b(CF_2)_c$,
Q is $(-CF_2-O-CXX')_d$
and R is $(-CXX'-O-CF_2)_e$;
(P,Q,R) is or contains one or more of P, Q, and R, n is 0 or 1;
a,b,c,d, and e are integers from 0 to 6; $\phi$ is a phenylene group
and A is chosen from the group consisting of —COOH, —CN, —COF, —COCl, —COOR, —COOM, —$CONR_2R_3$, —$SO_3H$, —$PO_3H_2$, and $PO_2H_2$,
where $R_1$ is a $C_1$ to $C_{10}$ alkyl group,
and $R_2$ and $R_3$ are chosen from the group consisting of —H, and $C_1$ to $C_{10}$ alkyl groups;
and M is chosen from the group consisting of —H and alkali metals.

20. The electrolytic cell of claim 19 wherein Y is chosen from the group consisting of $(CF_2)_xA$, —$O(CF_2)_xA$, $(OCF_2CFZ)_yA$, $(OCF_2CFZ)_x(OCF_2CF_2)A$, and —O—$CF_2(CF_2OCFZ)_y(CF_2)_y(CF_2OCFR)_z$
where x, y, and z are 1 to 10, and Z and R are chosen from the group consisting of —F and $C_1$ to $C_{10}$ alkyl groups.

21. The electrolytic cell of claim 20 wherein A is chosen from the group consisting of —COOH, —CN, —COF, —COCl, —COOR, —COOM, and $CONR_2R_3$.

22. In a permionic membrane formed of a fluorocarbon polymer having pendant ionic groups, said permionic membrane adapted for use between an anode and a cathode in an electrolytic cell to carry out an electrolytic reaction, said permionic membrane having a porous film of particles on at least one surface thereof, the improvement wherein the porous film comprises a random mixture of electrocatalyst particles and separate non-conductive surface catalyst particles, said electrocatalyst particles having an electrical conductivity of more than 10 (ohm-centimeters)$^{-1}$.

23. The permionic membrane of claim 22 wherein the porous film is bonded to the permionic membrane with a fluorocarbon polymer.

24. The permionic membrane of claim 22 wherein the porous film has a porosity of from about 10 to about 99 percent.

25. The permionic membrane of claim 22 wherein the porous film has a thickness of about 0.01 to about 300 microns.

26. The permionic membrane of claim 22 wherein the porous film contains from about 0.1 milligrams per square centimeter to about 100 milligrams per square centimeter of total surface catalyst and electrocatalyst.

27. The permionic membrane of claim 22 wherein the porous film contains from about 1 to about 95 weight percent electrocatalyst, basis total surface catalyst and electrocatalyst.

28. The permionic membrane of claim 22 wherein the porous film is on the cathodic surface of the permionic membrane, said cathodic surface intended to face a cathode.

29. The permionic membrane of claim 28 wherein the surface catalyst is chosen from the group consisting of oxides of titanium, tantalum, tungsten, zirconium, columbium, and mixtures thereof.

30. The permionic membrane of claim 28 wherein the electrocatalyst is chosen from the group consisting of Group VIII transition metals and mixtures thereof.

31. The permionic membrane of claim 28 wherein the cathode is the electrocatalyst in the porous surface.

32. The permionic membrane of claim 28 wherein the cathode is in contact with the porous surface.

33. The permionic membrane of claim 28 wherein the cathode is spaced from the porous surface.

34. The permionic membrane of claim 28 wherein the porous surface is on the anodic surface of the permionic membrane, said anodic surface intended to face an anode.

35. The permionic membrane of claim 22 wherein the surface catalyst is chosen from the group consisting of oxides of titanium, tantalum, tungsten, zirconium, columbium, and mixtures thereof.

36. The permionic membrane of claim 34 wherein the electrocatalyst is chosen from the group consisting of platinum group metals, oxides thereof, and oxycompounds thereof.

37. The permionic membrane of claim 33 wherein the anode is the electrocatalyst in the porous surface.

38. The permionic membrane of claim 33 wherein the anode is in contact with the porous surface.

39. The permionic membrane of claim 33 wherein the anode is spaced from the porous surface.

40. The permionic membrane of claim 1 wherein the fluorocarbon polymer has the moieties:

(CF$_2$—CXX')

and (CF$_2$—CXY)

where:
X is chosen from the group consisting of —F, —Cl, —H, and —CF$_3$;

X' is chosen from the group consisting of —F, —Cl, —H, —CF$_3$, and (CF$_2$)$_m$CF,
where m is an integer from 1 to 5;
Y is chosen from the group consisting of —A, —$\phi$A, —P—A, and
—O—(CF$_2$)$_n$—(P,Q,R)—A, where P is (—CF$_2$)(CXX')$_b$(CF$_2$)$_c$,
Q is (—CF$_2$—O—CXX')$_d$ and R is (—CXX'—O—CF$_2$)$_e$;
(P,Q,R) is or contains one or more of P, Q, and R, n is 0 or 1;
a, b, c, d, and e are integers from 0 to 6;
$\phi$ is a phenylene group and A is chosen from the group consisting of —COOH, —CN, —COF, —COCl, —COOR, —COOM, —CONR$_2$R$_3$, —SO$_3$H, —PO$_3$H$_2$, and PO$_2$H$_2$,
where R$_1$ is a C$_1$ to C$_{10}$ alkyl group,
and R$_2$ and R$_3$ are chosen from the group consisting of —H, and C$_1$ to C$_{19}$ alkyl groups;
and M is chosen from the group consisting of —H and alkali metals.

41. The permionic membrane of claim 39 wherein Y is chosen from the group consisting of (CF$_2$)$_x$A, —O(CF$_2$)$_x$A, (OCF$_2$CFZ)$_y$A, (OCF$_2$CFZ)$_x$(OCF$_2$CF$_2$)A, and —O—CF$_2$(CF$_2$OCFZ)$_y$(CF$_2$)$_y$(CF$_2$OCFR)$_z$ where x, y, and z are 1 to 10, and Z and R are chosen from the group consisting of —F and C$_1$ to C$_{10}$ alkyl groups.

42. In a method of electrolyzing an alkali metal chloride brine in an electrolytic cell having an anolyte compartment with an anode therein, a catholyte with a cathode therein, and a permionic membrane therebetween, said permionic membrane having a porous film thereon, which method comprises feeding alkali metal chloride brine to the anolyte compartment, passing an electrical current from the anode to the cathode, and recovering chlorine from the anolyte compartment, the improvement wherein the porous film comprises a random mixture of electrocatalyst particles and separate non-conductive surface catalyst particles, said electrocatalyst particles having an electrical conductivity of more than 10 (ohm-centimeters)$^{-1}$, and said particles being hydrophillic.

43. The permionic membrane of claim 40 wherein A is chosen from the group consisting of —COOH, —CN, —COF, —COCl, —COOR, —COOM, and CONR$_2$R$_3$.

44. The method of claim 42 wherein the porous film is bonded to the permionic membrane with a fluorocarbon polymer.

45. The method of claim 42 wherein the porous film has a porosity of from about 10 to about 99 percent.

46. The method of claim 42 wherein the porous film has a thickness of about 0.01 to about 300 microns.

47. The method of claim 42 wherein the porous film contains from about 0.1 milligram per square centimeter to about 100 milligrams per square centimeter of total surface catalyst and electrocatalyst.

48. The method of claim 42 wherein the porous film contains from about 1 to about 95 weight percent electrocatalyst, basis total surface catalyst and electrocatalyst.

49. The method of claim 42 wherein the porous film is on the cathodic surface of the permionic membrane.

50. The method of claim 48 wherein the surface catalyst is chosen from the group consisting of oxides of titanium, tantalum, tungsten, zirconium, columbium, and mixtures thereof.

51. The method of claim 49 wherein the electrocatalyst is chosen from the group consisting of Group VIII transition metals and mixtures thereof.

52. The method of claim 49 wherein the cathode is the electrocatalyst in the porous surface.

53. The method of claim 49 wherein the cathode is in contact with the porous surface.

54. The method of claim 49 wherein the cathode is spaced from the porous surface.

55. The method of claim 42 wherein the porous surface is on the anodic surface of the permionic membrane.

56. The method of claim 54 wherein the surface catalyst is chosen from the group consisting of oxides of titanium, tantalum, tungsten, zirconium, columbium, and mixtures thereof.

57. The method of claim 55 wherein the electrocatalyst is chosen from the group consisting of platinum group metals, oxides thereof, and oxycompounds thereof.

58. The method of claim 55 wherein the anode is the electrocatalyst in the porous surface.

59. The method of claim 55 wherein the anode is in contact with the porous surface.

60. The method of claim 55 wherein the anode is spaced from the porous surface.

61. The method of claim 60 wherein the permionic membrane is a fluorocarbon polymer having the moieties:

$(CF_2-CXX')$
and
$(CF_2-CXY)$ where:

X is chosen from the group consisting of —F, —Cl, —H, and —CF$_3$;

X' is chosen from the group consisting of —F, —Cl, —H, —CF$_3$, and $(CF_2)_m CF$,
where m is an integer from 1 to 5;

Y is chosen from the group consisting of —A, —$\phi$A, —P—A,
and
—O—$(CF_2)_n$—(P,Q,R)—A, where P is $(-CF_2)$ $(CXX')_b (CF_2)_c$, Q is $(-CF_2-O-CXX')_d$ and R is $(-CXX'-O-CF_2)_e$;

(P,Q,R) is or contains one or more of P, Q, and R, n is 0 or 1;

a,b,c,d, and e are integers from 0 to 6; $\phi$ is a phenylene group and A is chosen from the group consisting of —COOH, —CN, —COF, —COCl, —COOR, —COOM, —CONR$_2$R$_3$, —SO$_3$H, —PO$_3$H$_2$, and PO$_2$H$_2$, where R$_1$ is a C$_1$ to C$_{10}$ alkyl group, and R$_2$ and R$_3$ are chosen from the group consisting of —H, and C$_1$ to C$_{19}$ alkyl groups;

and m is chosen from the group consisting of —H and alkali metals.

62. The method of claim 61 wherein Y is chosen from the group consisting of $(CF_2)_x A$, —O$(CF_2)_x A$, $(OCF_2 CFZ)_y A$, $(OCF_2 CFZ)_x (OCF_2 CF_2)A$, and —O—$CF_2(CF_2 OCFZ)_y (CF_2)_y$ $(CF_2 OCFR)_z$ where x, y, and z are 1 to 10, and Z and R are chosen from the group consisting of —F and C$_1$ to C$_{10}$ alkyl groups.

63. The method of claim 61 wherein A is chosen from the group consisting of —COOH, —CN, —COF, —COCl, —COOR, —COOM, and CONR$_2$R$_3$.

* * * * *